United States Patent [19]
Zanarini

[11] Patent Number: 5,463,935
[45] Date of Patent: Nov. 7, 1995

[54] INFUSION MAKER

[75] Inventor: Gianfranco Zanarini, Ozzano Dell'Emilia, Italy

[73] Assignee: Biesse S.p.A., Collebeato, Italy

[21] Appl. No.: 246,116

[22] Filed: May 19, 1994

[30] Foreign Application Priority Data

Jun. 22, 1993 [IT] Italy ................................ BS93A0073

[51] Int. Cl.⁶ .................................................... A47J 31/04
[52] U.S. Cl. ................................ 99/292; 99/299; 99/305; 99/309
[58] Field of Search ............................ 99/292, 293, 299, 99/300, 304, 305, 306, 307, 308, 309, 310; 426/433

[56]  References Cited

U.S. PATENT DOCUMENTS

| 1,188,249 | 6/1916 | Cook | 99/299 |
| 2,543,528 | 2/1951 | Kaufmann | 99/292 |
| 5,281,785 | 1/1994 | Pasbrig | 99/306 |

FOREIGN PATENT DOCUMENTS 663218  4/1929  France ..................... 99/299

Primary Examiner—Robert W. Jenkins
Attorney, Agent, or Firm—McGlew and Tuttle

[57]  ABSTRACT

An infusion maker comprising, similarly to an espresso maker, a lower container or boiler (11) and an lapper container (12). The bottom (12') of the upper container (12) is provided with an outlet (16) which connects said upper container (12) with the intermediate cup (14), and the chimney conduit (15) conveying the liquid from the lower container to the upper container is provided with a movable sleeve (17) which may be moved from a position associated with the closing of said outlet (16) and the opening of said chimney conduit (15), thus permitting the passage of the liquid from the lower container into the upper container, to a position associated with the opening of said outlet (16) and the closing of said chimney conduit, thus causing the liquid in the upper container to pour into the lower container.

8 Claims, 2 Drawing Sheets

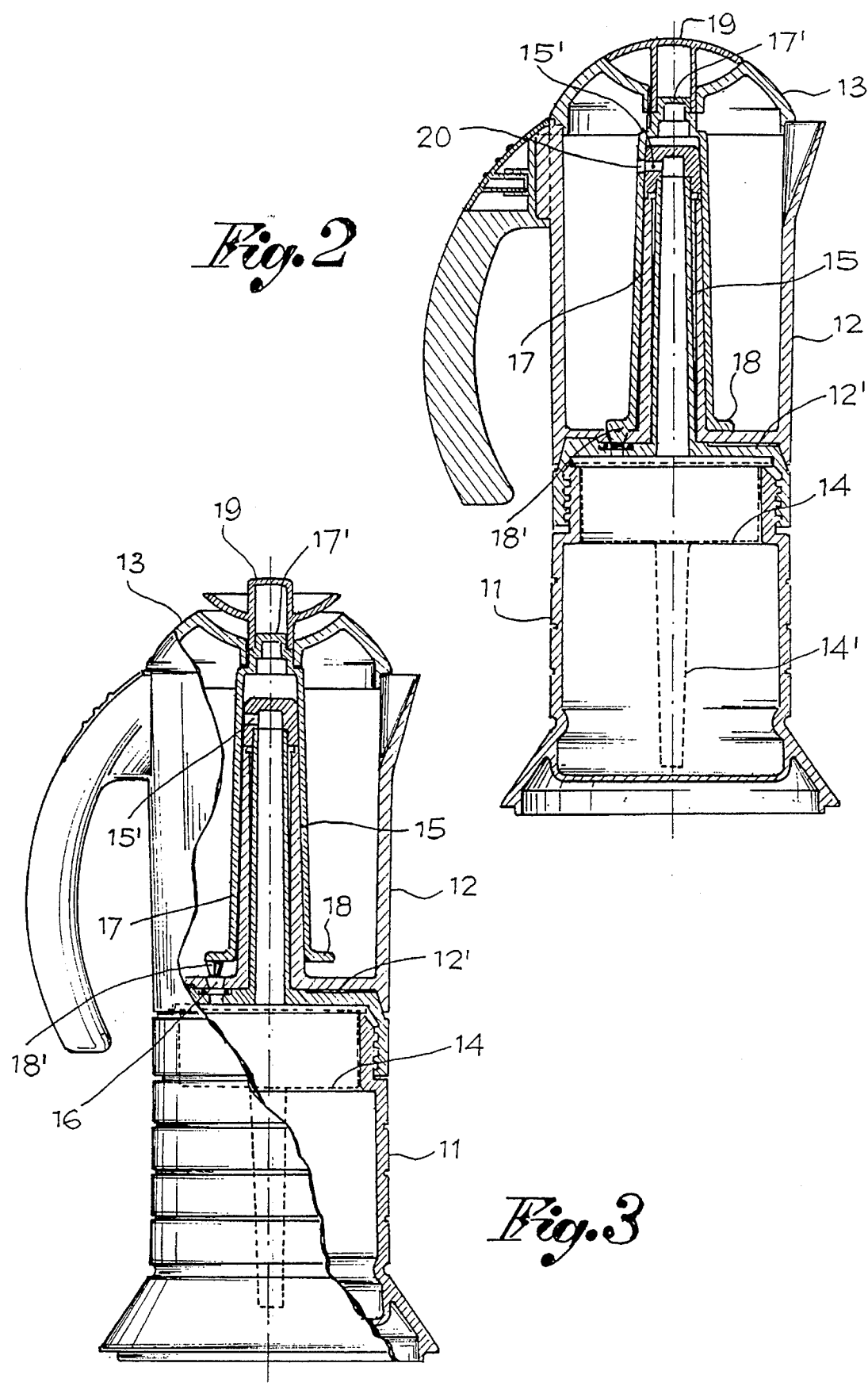

INFUSION MAKER

FIELD OF THE INVENTION

The present invention relates to an infusion maker for preparing infusions and similar potions.

BACKGROUND OF THE INVENTION

At present, infusion makers are known which have their own specific structure and only one modality of use.

SUMMARY AND OBJECTS OF THE INVENTION

It is an object of the present invention to provide an infusion maker that may be used advantageously as a real infusion maker and as an espresso maker as well, being it suitable for two modalities of use.

Another object of this invention is to provide an infusion maker having the same general configuration as an espresso maker, of the type comprising two containers superimposed and communicating through a filter, but suitable for permitting the passage of liquid from the lower container to the upper container and vice-versa, so that liquid may also flow several times through the product from which an infusion is obtained.

According to the invention, an infusion making machine for preparation of hot beverages including herbal infusion, tea type infusions, coffee infusions and similar, is provided including a lower container which defines a boiler. The lower container receives starting water. An upper container is provided with a cover. The upper container is designed to receive the infusion. A cup is disposed between the upper and lower containers. The cup defines a space for the material from which the infusion is produced. The upper and lower containers are blocked in position one above the other in a water tight manner. The cup is provided with a suction conduit which extends downwardly and ends in the proximity of the bottom of the lower container. The upper container is provided with a bottom from which a chimney conduit projects. The chimney conduit is open at the bottom for communication with the intermediate cup. The chimney conduit is closed at the top. The chimney conduit includes at least one radial hole which allows liquid in the lower container to run upwardly into the upper container, after flowing through the material in the cup, upon heating of the water within the lower container of the infusion maker. An outlet is provided in the bottom of the upper container. The outlet provides communication between the upper container and the intermediate cup. A movable sleeve element is provided on the chimney conduit which is movable at least between a radial hole open position/outlet closed position and a radial hole closed position/outlet open position. The sleeve provides a sleeve radial opening which coincides with the radial hole of the chimney conduit, in the sleeve radial hole open position/outlet closed position. The sleeve further includes a closing element for closing the outlet when the sleeve is in the radial hole opened position/outlet closed position. The closing element is moved out of the outlet in the sleeve radial hole closed position/outlet open position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a vertical sectional view of the machine, with water flowing upwards from the lower container to the upper container.

FIG. 3 is a sectional view similar to FIG. 2, but with water flowing downwards, from the upper container to the lower container of the machine.

DETAILED DESCRIPTION OF THE PREFERRED EMBODIMENT

Figure 1:
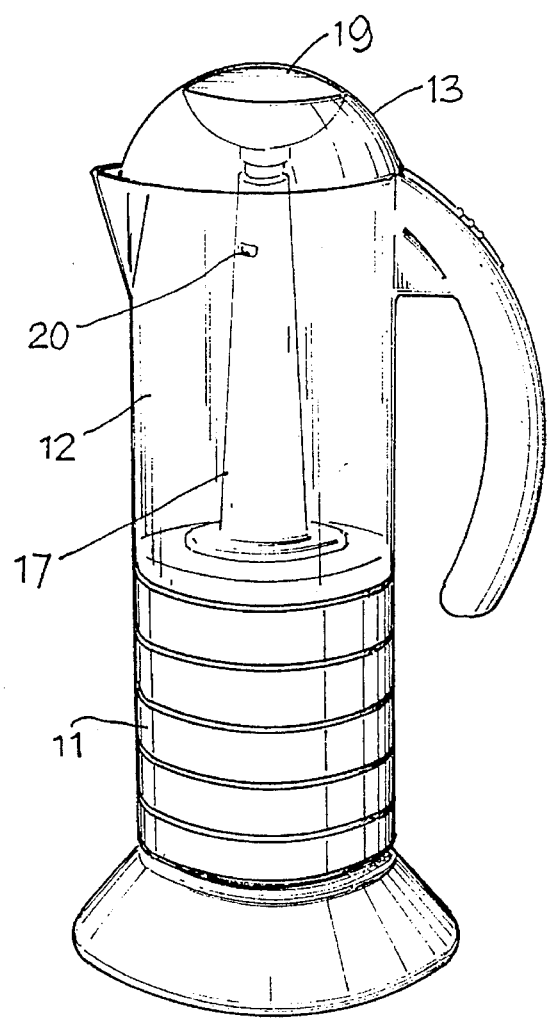
FIG. 1 is a perspective view of the infusion maker viewed from outside.

Such infusion maker—like any machine for the production of espresso coffee—comprises a lower container or boiler 11 designed to receive starting water, an upper container 12, with a handle, designed to receive an infusion and provided with a cover 13, and a cup 14 located between the lower and the upper containers, designed to contain the herbs or product used to get an infusion. Said cup 14 is designed to be introduced into the upper part of the lower container or boiler 11 and is provided with a suction conduit 14' which extends downwards and ends in proximity to the bottom of said lower container or boiler 11.

The upper container 12 is blocked, for example by screwing and in a watertight manner, on the lower container or boiler 11, and the bottom thereof 12' is above the intermediate cup 14 and the product contained therein. In the middle of the upper container 12, a chimney conduit 15 is provided which projects from the bottom thereof 12'. Such conduit 15 is open at the bottom towards the cup 14 and closed at the top, in proximity to which at least one radial hole 15' is provided.

According to this invention, the bottom 12' of the upper container 12 has an outlet 16 which connects the inside of the said container with the cup underneath 14. Around the outlet 16 a seal 16' may be provided. On the chimney conduit 15, a movable sleeve 17 is mounted which is susceptible of upward and rotatory displacements around the conduit. Said sleeve 17 has a base flange 18 parallel to the bottom 12' of the container 12 and is provided with a shaft 18' which is designed to be introduced into the bottom outlet 16 like a plug, in order to close it, also thanks to the seal 16'.

Said sleeve 17 also comprises an upper part 17' which extends axially through a cover 13 and which is fixed to a knob 19 located on the cover 13, preferably—but not necessarily—recessed in a cavity 13'.

Along the movable sleeve 17, a radial hole 20 is provided which may be moved far from or on a level with the radial hole 15' of the chimney conduit 15, the said movements being associated with displacements of the said sleeve 17.

Figure 5:
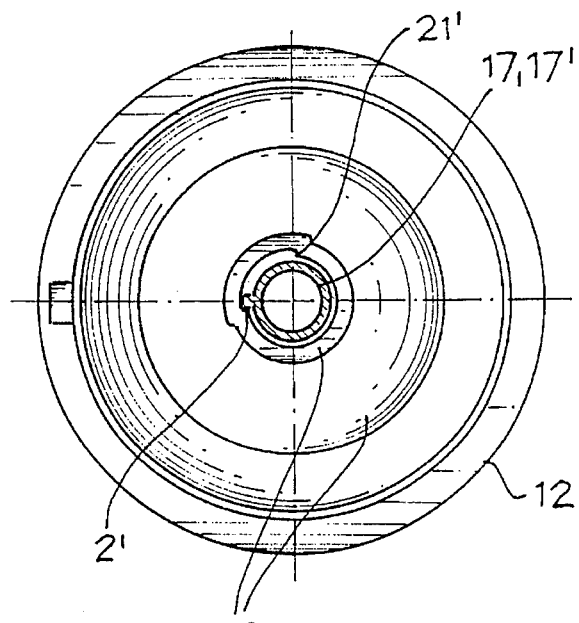
FIG. 5 is a cross-sectional view at the level of the cover.

In practice, by manually acting on the knob 19, the sleeve 17 may be displaced upwards or rotated with respect to the chimney conduit 15, such rotation being partial and defined by shoulders 21, 21' provided in the cover 13, on a level with knob 19—see FIG. 5.

More precisely, when knob 19 is rotated and knocks against a first shoulder 21, the sleeve 15 is completely displaced downwards, since its shaft 18' faces the bottom hole 12' of the container 12 and penetrates through it, thus closing it. The base flange 18 of the sleeve is near the hole 12' while the radial hole 20 in the sleeve is on a level and aligned with the radial hole 15' of the chimney conduit 15.

Figure 4:
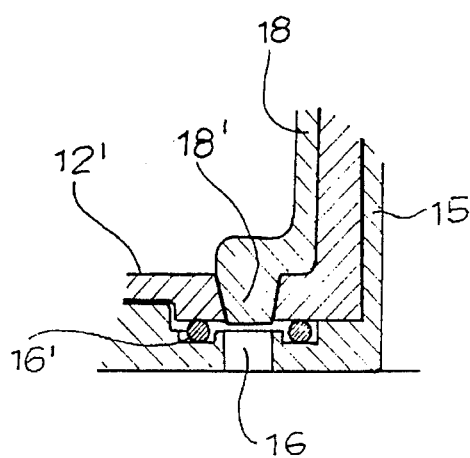
FIG. 4 is an enlarged detailed view of FIG. 2.

This configuration is shown in FIG. 2 and, with an enlarged detail, in FIG. 4, and permits the use of the device both as an usual espresso maker and as an infusion maker, according to the product put in the cup.

More particularly, for use as an infusion maker, when the device is heated on a source of heat—after it has been suitably filled with water and herbs or other products—the water runs through the suction conduit 14' and through the product previously put in the cup 14, it flows on through the chimney conduit 15 and pours into the upper container 12 by flowing through the hole 15' and the radial hole 20, coinciding with each other. The water, by flowing through the product in the cup 14, produces an infusion which will pour into the upper container 12. But only one passage of the water through the product from which the infusion is obtained may be insufficient to make a good infusion. The device described herein permits to cause the liquid to flow through the product in the cup several times.

In fact, when the infusion has poured into the upper container 12, after stopping or reducing heat, the sleeve may be lifted and rotated against the second shoulder 21' by acting on the knob 19, thus removing the closing shaft 18' from the bottom hole 12' and contemporarily moving the radial hole 20 in the sleeve 17 away from the hole 15' in the chimney conduit 15. This configuration is shown in FIG. 3 and causes the liquid to pour from the upper container into the lower container, after flowing through the product in the intermediate cup. Then, by rotating and lowering the sleeve to its initial position as shown in FIG. 2 and by heating the device again, the liquid will flow upwards again, through the product in the cup, and the infusion will finally pour into the upper container.

The device thus described is susceptible to formal and structural modifications, without thereby affecting the substance of this invention. Thus, for example, the sleeve, the bottom hole and the control means of the sleeve may have different configurations and/or be arranged in different positions, though still permitting the passage of water from one container to the other and vice-versa.

I claim:

1. An infusion maker for making hot beverages based on material including herbs, coffee and tea, the infuser comprising:

a lower container for receiving starting water, said lower container defining a boiler;

an upper container provided with a cover;

a cup positioned between said upper container and said lower container, said cup for holding the material from which the infusion is produced;

a cup suction conduit extending from said cup downwardly and ending in a proximity of a bottom of said lower container;

a chimney conduit extending upwardly through a bottom of said upper container, said chimney conduit being open at a bottom for communication with said cup, said chimney conduit being closed at a top and having at least one radial hole providing communication for liquid in the lower container to run upwardly into said upper container, after flowing through the material in the cup, upon heating the infusion maker;

said bottom of said upper container defining an outlet connecting said upper container with said cup;

a movable sleeve connected to said chimney conduit, said sleeve including a sleeve opening, said sleeve being movable relative to said radial hole to define a radial hole open position, providing communication between an interior of said chimney conduit and said upper container and said sleeve being movable to cover said radial hole in a radial hole closed position, said sleeve including a closing element, said closing element being movable with said sleeve to an outlet closed position for closing said outlet and being movable to a outlet open position wherein liquid from said upper container pours into said cup, said radial hole open position of said sleeve corresponding with said outlet closed position of said sleeve and said radial hole closed position of said sleeve corresponding with said outlet open position of said sleeve.

2. An infusion maker according to claim 1, wherein said sleeve forms a cap of said chimney conduit, a knob being fixed to said sleeve, said knob being located on said cover and being displaceable with said sleeve.

3. An infusion maker according to claim 1, wherein said closing element of said sleeve is a closing shaft formed as a plug for introduction into said outlet, said sleeve opening being provided as a sleeve radial hole, said sleeve radial hole being movable with said sleeve to a position wherein said sleeve radial hole coincides with said radial hole, said movements being associated with displacement of said sleeve.

4. An infusion maker according to claim 3, wherein one of said outlet and said closing shaft are provided with seal.

5. An infusion maker according to claim 3, wherein said sleeve is rotationally displaceable and displaceable vertically.

6. An infusion maker according to claim 1, wherein said closing element of said sleeve is a closing shaft formed as a plug for introduction into said outlet, said sleeve opening being provided as a sleeve radial hole, said sleeve radial hole being movable with said sleeve to a position wherein said sleeve radial hole coincides with said radial hole, said movements being associated with displacement of said sleeve.

7. An infusion maker according to claim 1, wherein said outlet closed position of said sleeve and said radial hole open position of said sleeve define an espresso coffee making position.

8. An infuser comprising:

a lower container for receiving starting water, said lower container defining a boiler;

an upper container provided with a cover;

a cup positioned between said upper container and said lower container, said cup for holding the material from which the infusion is produced;

a cup suction conduit extending from said cup downwardly and ending in a proximity of a bottom of said lower container;

a chimney conduit extending upwardly through a bottom of said upper container, said chimney conduit being open at a bottom for communication with said cup, said chimney conduit being closed at a top and having at least one radial hole providing communication for liquid in the lower container to run upwardly into said upper container, after flowing through the material in the cup, upon heating the infusion maker;

said bottom of said upper container defining an outlet connecting said upper container with said cup;

valve means connected to said chimney conduit for closing said radial hole in a radial hole closed position, closing said radial hole in a radial hole open position, providing communication between an interior of said chimney conduit and said upper container, closing said outlet in an outlet closed position opening said outlet in an outlet open position, providing communication between said upper container and said cup, said valve means said radial hole open position corresponding with said outlet closed position and said radial hole closed position corresponding with said outlet open position.

* * * * *